(12) United States Patent
Vered

(10) Patent No.: US 12,282,393 B2
(45) Date of Patent: Apr. 22, 2025

(54) CLOUD COMPUTING SANDBOX BACKUP

(71) Applicant: Own Data Company Ltd, Tel Aviv (IL)

(72) Inventor: Gadi Luc Vered, Tenafly, NJ (US)

(73) Assignee: Own Data Company Ltd, Tel Aviv (IL)

( * ) Notice: Subject to any disclaimer, the term of this patent is extended or adjusted under 35 U.S.C. 154(b) by 78 days.

(21) Appl. No.: 18/307,501

(22) Filed: Apr. 26, 2023

(65) Prior Publication Data

US 2024/0362120 A1 Oct. 31, 2024

(51) Int. Cl.
*G06F 11/14* (2006.01)
*G06F 16/11* (2019.01)

(52) U.S. Cl.
CPC ...... *G06F 11/1451* (2013.01); *G06F 11/1464* (2013.01); *G06F 16/125* (2019.01)

(58) Field of Classification Search
CPC . G06F 11/1451; G06F 11/1464; G06F 16/125
See application file for complete search history.

(56) References Cited

U.S. PATENT DOCUMENTS

| 9,910,762 | B2 | 3/2018 | Chandra et al. | |
|---|---|---|---|---|
| 9,973,570 | B2* | 5/2018 | Anderson | H04L 67/10 |
| 10,229,125 | B2* | 3/2019 | Goodman | G06F 16/122 |
| 11,263,171 | B2* | 3/2022 | Borate | G06F 16/128 |
| 11,341,029 | B1* | 5/2022 | Mardix | G06F 8/60 |
| 11,341,234 | B1* | 5/2022 | Voss | G06F 11/1464 |
| 2016/0323145 | A1* | 11/2016 | Anderson | H04L 67/1097 |
| 2017/0052879 | A1* | 2/2017 | Chandra | G06F 11/3664 |

OTHER PUBLICATIONS

Salesforce, "Tooling API: Reference and Developer Guide," Feb. 2, 2023, version 56.0, 819 pages.
salesforce.stackexchange.com [online], "How do I detect the environment in Salesforce?," Oct. 2, 2009, retrieved on Apr. 4, 2023, retrived from URL<https://stackoverflow.com/questions/1507718/how-do-i-detect-the-environment-in-salesforce>, 6 pages.

(Continued)

*Primary Examiner* — Huawen A Peng
(74) *Attorney, Agent, or Firm* — Fish & Richardson P.C.

(57) ABSTRACT

Methods, systems, and apparatus, including computer programs encoded on computer storage media, for backing up environments. One of the methods includes maintaining, for a cloud computing environment, first data that indicates one or more previously active sandbox environments; determining second data that indicates one or more most recently active sandbox environments; determining, using the second data, a newly added sandbox environment; determining, using a first identifier for the newly added sandbox environment and a second identifier for a prior sandbox environment from the one or more previously active sandbox environments, whether the newly added sandbox environment is likely a refresh of the prior sandbox environment; and performing one or more actions for the newly added sandbox environment using a result of the determination whether the newly added sandbox environment is likely a refresh of the prior sandbox environment.

20 Claims, 2 Drawing Sheets

(56) References Cited

OTHER PUBLICATIONS salesforce.stackexchange.com [online], "how to find the environment type of salesforce sandbox," Sep. 27, 2017, retrieved on Apr. 4, 2023, retrived from URL<how to find the environment type of salesforce sandbox>, 2 pages.

wikipedia.com [online], "Deployment environment," Jun. 15, 2015, retrieved on Apr. 4, 2023, retrieved from URL<https://en.wikipedia.org/w/index.php?title=Deployment_environment&oldid=1145854933>, 5 pages.

wikipedia.com [online], "Sandbox (software development)," Jul. 22, 2006, retrieved on Apr. 4, 2023, retrieved from URL<https://en.wikipedia.org/w/index.php?title=Sandbox_(software_development)&oldid=1135761242>, 2 pages.

* cited by examiner

CLOUD COMPUTING SANDBOX BACKUP

BACKGROUND

Various systems can create backups of the data stored on the system. For instance, a system that includes a database can backup data from the database. This can include storing data from the database on multiple memories.

SUMMARY

In general, one aspect of the subject matter described in this specification can be embodied in methods that include the actions of maintaining, for a cloud computing environment that includes a live production environment and one or more sandbox environments each of which were seeded using data from the live production environment and are not refreshed with new data from the live production environment, first data that indicates one or more previously active sandbox environments; determining second data that indicates one or more most recently active sandbox environments; determining, using the second data, a newly added sandbox environment from the one or more most recently active sandbox environments that is not included in the one or more previously active sandbox environments; determining, using a first identifier for the newly added sandbox environment and a second identifier for a prior sandbox environment from the one or more previously active sandbox environments, whether the newly added sandbox environment is likely a refresh of the prior sandbox environment a) from the one or more previously active sandbox environments and b) that is not included in the one or more most recently active sandbox environments; and performing one or more actions for the newly added sandbox environment using a result of the determination whether the newly added sandbox environment is likely a refresh of the prior sandbox environment.

Other implementations of this aspect include corresponding computer systems, apparatus, computer program products, and computer programs recorded on one or more computer storage devices, each configured to perform the actions of the methods. A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

The foregoing and other embodiments can each optionally include one or more of the following features, alone or in combination. In some implementations, performing the one or more actions can include automatically adding the newly added sandbox environment to a list of environments to backup in response to determining that the newly added sandbox environment can be likely a refresh of the prior sandbox environment that was previously on the list of environments to backup.

In some implementations, the method can include removing the prior sandbox environment from the list of environments to backup. Performing the one or more actions can include backing up the newly added sandbox environment in response to determining that the newly added sandbox environment can be likely a refresh of the prior sandbox environment. Backing up the newly added sandbox environment can include: providing, to a device, a request whether the newly added sandbox environment should be backed up in response to determining that the newly added sandbox environment can be likely a refresh of the prior sandbox environment; and in response to providing the request, receiving a response that indicates that the newly added sandbox environment should be backed up.

In some implementations, the method can include archiving a backup of the prior sandbox environment. Performing the one or more actions can include associating, in a database, the newly added sandbox environment with the prior sandbox environment to enable analysis of the newly added sandbox environment with the prior sandbox environment. Enabling analysis of the newly added sandbox environment with the prior sandbox environment can include enabling at least one of comparison, find, or restore analysis of the newly added sandbox environment with the prior sandbox environment. The method can include: providing, to a device, a request for confirmation that the newly added sandbox environment can be a refresh of the prior sandbox environment; and in response to providing the request, receiving a response that indicates that the newly added sandbox environment can be a refresh of the prior sandbox environment, where associating, in the database, the newly added sandbox environment with the prior sandbox environment to enable analysis of the newly added sandbox environment with the prior sandbox environment can be responsive to receiving the response that indicates that the newly added sandbox environment can be a refresh of the prior sandbox environment.

In some implementations, determining the second data that indicates the one or more most recently active sandbox environments can include: sending, to the cloud computing environment and using an application programming interface, a request for information about active sandboxes for an entity; and in response to sending the request for information about active sandboxes for the entity, receiving, from the cloud computing environment, the second data that indicates the one or more most recently active sandbox environments for the entity. The second data can include at least one of an environment name, an environment type, time data, or an environment identifier.

In some implementations, maintaining the first data that indicates the one or more previously active sandbox environments can include: sending, to the cloud computing environment and using an application programming interface, a request for data for all environments for an entity; and in response to sending the request for data for all environments for the entity, receiving, from the cloud computing environment, at least some of the first data that indicates the one or more previously active sandbox environments for the entity. The first data can include at least one of an environment name, an environment status, an environment type, or an environment identifier.

In some implementations, determining whether the newly added sandbox environment can be likely a refresh for the prior sandbox environment can include: determining, using the first data and the second data and the second identifier for the prior sandbox environment, a first time period during which the prior sandbox environment was deleted; determining, using the second data and the first identifier for the newly added sandbox environment, a second time period during which the newly added sandbox environment was created; and determining whether the first time period and the second time period satisfy a time period criteria.

In some implementations, determining the first time period during which the prior sandbox environment was deleted uses i) an environment status and an environment identifier for the prior sandbox environment from the first data and ii) a timestamp for a most recent response that included at least some of the second data and did not include the environment identifier for the prior sandbox environment. The first data indicated that the environment status for the prior sandbox environment, prior to receipt of the most recent response that included at least some of the second data and did not include the environment identifier for the prior sandbox environment, was active.

In some implementations, determining whether the newly added sandbox environment can be likely a refresh for the prior sandbox environment can include determining whether the first identifier and the second identifier satisfy an identifier sequence criteria. Determining whether the newly added sandbox environment can be likely a refresh for the prior sandbox environment can include: determining, using the first data and the second identifier for the prior sandbox environment, a first environment type for the prior sandbox environment; determining, using the first identifier for the newly added sandbox environment, a second environment type for the newly added sandbox environment; and determining whether the first environment type and the second environment type satisfy an environment type criteria.

This specification uses the term "configured to" in connection with systems, apparatus, and computer program components. That a system of one or more computers is configured to perform particular operations or actions means that the system has installed on it software, firmware, hardware, or a combination of them that in operation cause the system to perform those operations or actions. That one or more computer programs is configured to perform particular operations or actions means that the one or more programs include instructions that, when executed by data processing apparatus, cause the apparatus to perform those operations or actions. That special-purpose logic circuitry is configured to perform particular operations or actions means that the circuitry has electronic logic that performs those operations or actions.

The subject matter described in this specification can be implemented in various implementations and may result in one or more of the following advantages. In some implementations, the systems and methods described in this specification can automatically detect sandbox environments for backup, e.g., that would otherwise not be backed up. In some implementations, the systems and methods described in this specification can automatically archive refreshed, deleted, or both, sandbox environments. In some implementations, the systems and methods described in this specification can identify newly created sandbox environments for an entity and recommend change resources available to the entity for backup purposes, e.g., which can result in a pricing change. In some implementations, the systems and methods described in this specification can identify newly created sandbox environments for backup, e.g., that might otherwise not be analyzed to determine whether a backup of those environments should be made. In some implementations, the systems and methods described in this specification can automatically associate inactive sandbox environments with their refresh sandbox environments for joint analysis of the two sandbox environments.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Some cloud computing environments can include live production environments and test sandbox environments. The sandbox environments can be seeded from the production environments when created. However, as data in the production environment changes, the data used to seed a sandbox environment becomes stale because the changes to the production environment are not populated to the sandbox environment. To update the data for the sandbox environment, sometimes the old sandbox environment is deleted and a new sandbox environment is created, e.g., for instance in Salesforce. But this deletion and creation process can lose the continuity of the old and new sandbox environments, e.g., when the new sandbox environment has a different identifier. Further, when a backup system only backs up a predetermined list of environments, the new sandbox environment might not be added to the list of environments for backup.

A system, e.g., a backup system, can query the cloud computing environment to determine a relationship between old, deleted sandbox environments and newly created sandbox environments. When the cloud computing platform does not provide this information, the system can use one or more queries, e.g., for an application programming interface ("API") provided by the cloud computing platform, to determine the relationship.

For instance, the system can use "SandboxInfo", "SandboxProcess," or a combination of both to determine an environment identifier, an environment status, an environment type, an environment name, time data, or a combination of two or more of these. The system can use the environment identifiers to determine a first time period during which the old sandbox environment was deleted and a second time period during which the new sandbox environment was created. The system can use the first time period and the second time period to determine whether the two sandbox environments are related, e.g., if no other sandboxes were created or deleted between the two time periods.

The system can use information about newly created sandbox environments to prompt a user whether the newly created sandbox environments should be backed up. When there is likely a relationship with an old sandbox environment, the prompt can include information about the relationship. The system can use information about an environment type for a sandbox environment to indicate one or more limitations of a destination environment when seeding the destination environment from a different type of environment that has different computational resource restrictions.

In some examples, the system can use information about the relationship to provide functionality that was not previously available. For instance, the system can correlate multiple different backups for different sandbox environments to enable compare, restore, find, or a combination of these, functionality between the sandbox environments.

Figure 1:
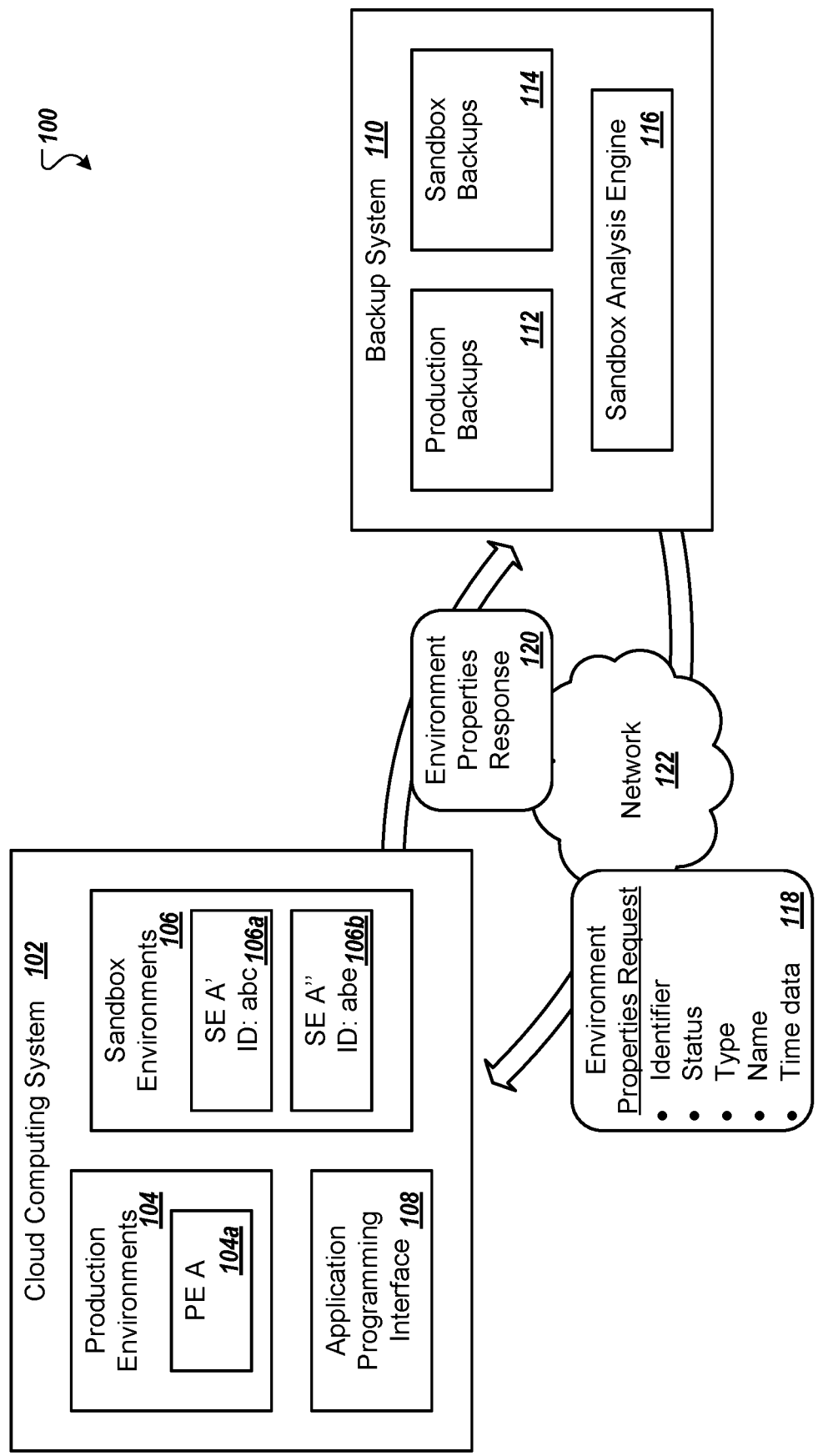
FIG. 1 depicts an example of an environment for backing up sandboxes.

FIG. 1 depicts an example of an environment 100 for backing up sandboxes. The environment 100 includes a cloud computing system 102 that can maintain multiple environments, whether production or sandbox environments or a combination of both. The environment 100 includes a backup system 110 that maintains backups for at least some of the multiple environments. As described in more detail below, the backup system 110 can analyze data for the environments to determine when a newly created sandbox environment, that uses updated production data, replaces a prior sandbox environment.

The cloud computing system 102 can maintain multiple production environments 104. The production environments 104 can be for a single entity, e.g., business or department in a business, or multiple entities.

The production environments 104 are environments with live data with which people can interact. The people can be customers of the entity for which a corresponding production environment, e.g., a production environment A 104a, is maintained. As the people interact with the data, at least some of the data for the production environment A 104a can change. The data that changes can be data that is accessible by a user, e.g., user account data, metadata, e.g., used by the cloud computing system 102 or another system or accessing by an administrator, or a combination of both.

The cloud computing system 102 maintains sandbox environments 106 to enable testing for a corresponding production environment. The testing can include changes to the code for the production environment, such as the addition of a new field to a database included in the production environment A 104a or changes to an operation used to process data in the production environment A 104a.

When the cloud computing system 102 creates a sandbox environment for the production environment A 104a, such as a first sandbox environment A' 106a, the cloud computing system 102 copies at least some of the data for the production environment A 104a to the first sandbox environment A' 106a. The particular data copied, or amount of data copied, can be selected using a type of the first sandbox environment A' 106a, the portion of the production environment A 104a that will be tested, or a combination of both.

For instance, the cloud computing system 102 can receive a request to test new code for a particular operation of the production environment A 104a. The cloud computing system 102 can determine which operations and data are necessary for execution of the particular operation. The cloud computing system 102 can copy the code for the determined operations and the determined data to the first sandbox environment A' 106a. The cloud computing system 102 can receive the request to test the new code from a device, e.g., operated by an administrator, executing a test system, or both.

In some implementations, one or more of the sandbox environments 106 can have an environment type. The environment type can be full, developer, or partial, to name a few examples. The different environment types can indicate different properties for a corresponding environment. For instance, the production environments 104 can have an environment type of full. The sandbox environments can have environment types of full, developer, or partial. The different properties can be any appropriate cloud computing properties, such as maximum data size, operations during a time period, number of concurrent users, or a combination of these.

The cloud computing system 102 can select data to copy to the first sandbox environment A' 106a using the environment type. For instance, when the first sandbox environment A' 106a is a sandbox for the production environment A 104a, the cloud computing system 102 can select data from the production environment A 104a using any limitations defined by the environment type. These limitations can include a maximum amount of data that can be copied from the production environment A 104a.

Once the cloud computing system 102 creates the first sandbox environment A' 106a from the production environment A 104a, the data for the first sandbox environment A' 106a becomes stale. This occurs as data for the production environment A 104a changes over time. For instance, after the first sandbox environment A' 106a is created, the production environment A 104a can update data in a database. The updated data can include metadata, production data, e.g., that is viewable by a person, or a combination of both.

The first sandbox environment A' 106a can be used to test various new functionality that might be implemented in the production environment A 104a. For instance, the first sandbox environment A' 106a can be used to test a potential new operation that can add new functionality to the production environment. The new functionality can be a new datatype, a new operation, such as a new query, or a combination of both.

Since the data in the first sandbox environment A' 106a is stale, the testing of the new functionality in the first sandbox environment A' 106a might not use all potential test cases available. For instance, some of the updates to the live production data in the production environment A 104a might include data for test cases that was not included in the data used to create, e.g., seed, the first sandbox environment A' 106a. As a result, the cloud computing system 102 can create a second sandbox environment A" 106b with updated production data from the production environment A 104a. The second sandbox environment A" 106b can be a refresh of the first sandbox environment A' 106a.

The cloud computing system 102 can create the second sandbox environment A" 106b in any appropriate manner. For instance, the cloud computing system 102 can create the second sandbox environment A" 106b in response to receipt of input requesting the creation of the second sandbox environment A" 106b, e.g., from an administrator device.

When the cloud computing system 102 creates the second sandbox environment A" 106b, the cloud computing system 102 create a new environment identifier for the second sandbox environment A" 106b that is different than an environment identifier for the first sandbox environment A' 106a. For example, since copying data, code, or both, from the production environment A 104a might inadvertently create bugs, the cloud computing system 102 can create a new sandbox environment for the second sandbox environment A" 106b. As a result, the second sandbox environment A" 106b can have some different properties from the first sandbox environment A' 104a. Some examples of different properties can include a different environment identifier, a different creation date, a different number of days since creation, a different name, a different description, a different status, or a combination of two or more of these.

The identifier can be any appropriate identifier. For instance, the identifier can be a sandbox identifier, an organization identifier, e.g., that is unique to the sandbox, or another appropriate type of identifier.

The second sandbox environment A" 106b can have a different status than the first sandbox environment A' 106a when the first sandbox environment A' 106a is deleted or otherwise removed from an active, completed, or both status. In this example, the second sandbox environment A" 106b can have an active status, a completed status, or both.

The first sandbox environment A' 106a can have a deleted status because of the creation of the second sandbox environment A" 106b. For instance, since the developer created the new second sandbox environment A" 106b with data from the production environment 104a, the cloud computing system 102 can receive a request from a developer device that requests deletion of the first sandbox environment A' 106a that has older data than the second sandbox environment A" 106b.

In some implementations, the second sandbox environment A" 106b can have some properties that are the same as properties for the first sandbox environment A' 106a. For example, the second sandbox environment A" 106b can have the same environment type as the first sandbox environment A' 106a.

The backup system 110 can backup various environments from the cloud computing system 102. For instance, the backup system 110 can back up one or more of the production environments 104, e.g., depending on the configuration of the respective production environments by the corresponding entities for which the production environments are maintained. The backup system 110 can maintain one or more production backups 112 for at least some of the production environments 104.

Sometimes the backup system 110 can backup various ones of the sandbox environments 106. Given resource constraints, e.g., network bandwidth, data storage, or both, for backing up environments, the backup system 110 backs up only some of the sandbox environments 106. The backup system 110 can maintain one or more sandbox backups 114 for some of the sandbox environments 106.

When a sandbox environment 106 is deleted, the backup system 110, e.g., a sandbox analysis engine 116 included in the backup system 110, can detect the deletion and determine to no longer backup the deleted environment. For instance, the backup system 110 can submit an environment properties request 118 to the cloud computing system that requests the status of one or more environments. The one or more environments can be environments for which the backup system 110 maintains backups, all environments for an entity for which the backup system 110 maintains backups, or a combination of both.

When the backup system 110 determines that a particular environment, e.g., the first sandbox environment A' 106a, is deleted, the backup system 110 can determine to skip future backups of the particular environment. For example, the backup system 110 can receive an environment properties response 120 from the cloud computing system 102 and determine that the first sandbox environment A' 106a has a status of deleted. In response, the backup system 110 can remove an identifier for the first sandbox environment A' 106a from a list of environments to backup.

Since the new second sandbox environment A" 106b has a different identifier than the deleted first sandbox environment A' 106a, the backup system 110 might not backup the new second sandbox environment A" 106b, e.g., even though the new second sandbox environment A" 106b was meant to replace, e.g., be a refresh of, the deleted first sandbox environment A' 106a. In some examples, the cloud computing system 102, the backup system 110, or both, might receive data from a developer device as part of the process to create the second sandbox environment A" 106b that indicates whether the second sandbox environment A" 106b should be backed up. If neither the cloud computing system 102 nor the backup system 110 receives data indicating whether the second sandbox environment A" 106b should be backed up, the backup system 110 would not back up the second sandbox environment A" 106b, e.g., even though the backup system 110 previously backed up the first sandbox environment A' 106a that the second sandbox environment A" 106b is replacing.

To detect that the second sandbox environment A" 106b is likely a refresh of the first sandbox environment A' 106a, the backup system 110, e.g., the sandbox analysis engine 116, can analyze various properties for the first sandbox environment A' 106a and the second sandbox environment A" 106b. For instance, the backup system 110 can send one or more environment properties requests 118 to the cloud computing system 102. The request can be for one or more properties of the first sandbox environment A' 106a, the second sandbox environment A" 106b, or both. The sandbox analysis engine 116 can compare one or more properties for the first sandbox environment A' 106a and the second sandbox environment A" 106b to determine whether the latter is a refresh of the former and should or should likely be backed up.

In some implementations, the backup system 110 can use at least some of the properties of the first sandbox environment A' 106a and the second sandbox environment A" 106b to determine whether the second sandbox environment A" 106b is likely a refresh of the first sandbox environment A' 106a. For example, sandbox analysis engine 116 can use one or more of the properties from one or more environment properties responses 120 to determine whether the second sandbox environment A" 106b is a refresh of the first sandbox environment A' 106a.

In some implementations, the backup system 110 can use a name similarity threshold to determine whether the second sandbox environment A" 106b is likely a refresh of the first sandbox environment A' 106a. For instance, when the names for the two environments are the same or substantially similar, as determined using the name similarity threshold, the backup system 110 can determine that the second sandbox environment A" 106b is likely a refresh of the first sandbox environment A' 106a. Some examples of names can include "Production A Sandbox A" and "Production A Sandbox B" for the first and second sandbox environments, respectively. In this example, although the names are not exactly the same, the backup system 110 can determine that the names satisfy the name similarity threshold.

In some implementations, the backup system 110 can use an environment type to determine whether the second sandbox environment A" 106b is likely a refresh of the first sandbox environment A' 106a. For instance, when the backup system 110 determines that the two sandbox environments have the same environment type, e.g., partial or developer, the backup system 110 can determine that there is a higher likelihood that the second sandbox environment A" 106b is a refresh of the first sandbox environment A' 106a than if the two sandboxes had different environment types. In some examples, the backup system 110 uses the environment type in conjunction with other sandbox properties.

In some implementations, the backup system 110 can use time data to determine whether the second sandbox environment A" 106b is likely a refresh of the first sandbox environment A' 106a. The time data can be any appropriate time data, such as a creation date, a deletion date, a time period, or a combination of these. The time period can be a time period in which a sandbox was created or deleted.

In some examples, the backup system 110 can determine data for a creation date using a query to the cloud computing system 102. The query can be a call to an application programming interface 108 included as part of the cloud computing system 102. In some examples, the query can be a request for information about active sandboxes on the cloud computing system 102 for an entity, e.g., a sandbox info call. In response, the backup system 110 can receive, from the application programming interface 108, data that indicates a creation date for the second sandbox environment A" 106b, that indicates a number of days active for the second sandbox environment A" 106b, or a combination of both.

When the backup system 110 is unable to request creation data, deletion data, or both, the backup system 110 can use one or more queries to determine a time period for creation or deletion. For instance, the backup system 110 can request data for all environments for an entity, whether the environments are active or deleted, e.g., using a sandbox process call. The backup system 110 can use data responsive to the request to determine a time period during which a sandbox was likely created or deleted. For example, the backup system 110 can have first data for a backup of the first sandbox environment A' 106a, for a prior query that indicates that the first sandbox environment A' 106a was active, or both. The backup system 110 can have second data that indicates that the first sandbox environment A' 106a is no longer active, e.g., deleted. The backup system 110 can use date information, e.g., timestamps, for the first data and the second data to determine a time period during which the first sandbox environment A' 106a was likely deleted.

The backup system 110 can determine whether the creation date for the second sandbox environment A" 106b and the deletion date for the first sandbox environment A' 106a satisfy a time period criteria. For instance, when the creation date is within a time period for the deletion date, the backup system 110 can determine that the second sandbox environment A" 106b is more likely a refresh of the first sandbox environment A' 106a than if the creation date was not within the time period for the deletion date. When the creation date is the same as, or within a threshold time period from, the deletion date, the backup system 110 can determine that the second sandbox environment A" 106b is more likely a refresh of the first sandbox environment A' 106a than if the creation date was not within the threshold time period from, and was not the same as, the deletion date. In some implementations, the backup system 110 uses date information with one or more other properties.

In some implementations, the backup system 110 can use environment identifiers to determine whether the second sandbox environment A" 106b is likely a refresh of the first sandbox environment A' 106a. For instance, the backup system 110 can determine whether environment identifiers for the two sandboxes satisfy an identifier criteria. The identifier criteria can be that the two identifiers are sequential or within a distance threshold of each other sequentially. For example, when the first sandbox environment A' 106a has an identifier of "abc" and the second sandbox environment A" 106b has an identifier of "abe", the backup system 110 can determine that the two identifiers satisfy the distance threshold. If the first sandbox environment A' 106a had an identifier of "abc" while the second sandbox environment A" 106b had an identifier of "xyz", then the backup system 110 can determine that the two identifiers do not satisfy the distance threshold. The backup system 110 might determine that the identifiers for the two sandbox systems do not satisfy the identifier criteria when another sandbox environment 106 was created or deleted between the creation and deletion of the first sandbox environment A' 106a and the second sandbox environment A" 106b.

In some examples, the backup system 110 can perform the sequential identifier analysis using identifiers for a particular entity. For instance, when the cloud computing system 102 maintains the production environment A 104a, the first sandbox environment A' 106a, and the second sandbox environment A" 106b, the backup system 110 can use data that indicates all of the identifiers for the environments the cloud computing system 102 maintains for the particular entity. This can account for any identifiers that are assigned to environments for other entities.

In some implementations, the backup system 110 can use a combination of the above mentioned properties. For instance, the backup system 110 can use the time data, type, and status to determine a likelihood that the second sandbox environment A" 106b is a refresh of the first sandbox environment A' 106a.

The backup system 110 can use the application programming interface 108 to request environment properties, e.g., using one or more environment properties requests 118, from the cloud computing system 102. The application programming interface 108 can generate environment properties responses 120 for at least some, if not all, of the corresponding environment properties requests 118.

In some implementations, the backup system 110 can perform one or more of the operations described in this specification automatically, e.g., without receipt of user input indicating an instruction to perform the operation. For instance, the backup system 110 can determine to backup a refresh sandbox environment, archive an inactive sandbox environment, or a combination of both, automatically.

The cloud computing system 102 and the backup system 110 are examples of a system implemented as computer programs on one or more computers in one or more locations, in which the systems, components, and techniques described in this specification are implemented. A network 122, such as a local area network ("LAN"), wide area network ("WAN"), the Internet, or a combination thereof, connects the cloud computing system 102 and the backup system 110. The cloud computing system 102 and the backup system 110 can each use a single server computer or multiple server computers operating in conjunction with one another, including, for example, a set of remote computers deployed as a cloud computing service.

The cloud computing system 102 and the backup system 110 can each include several different functional components, including the production environments 104, the sandbox environments 106, the application programming interface 108, the production backups 112, and the sandbox backups 114. Any of these components can include one or more data processing apparatuses, can be implemented in code, or a combination of both. For instance, each of the application programming interface 108 and the sandbox analysis engine 116 can include one or more data processors and instructions that cause the one or more data processors to perform the operations discussed herein.

The various functional components of cloud computing system 102 and the backup system 110 can be installed on one or more computers as separate functional components or as different modules of a same functional component. For example, the components the application programming interface 108, the sandbox analysis engine 116, or both, can be implemented as computer programs installed on one or more computers in one or more locations that are coupled to each through a network. In cloud-based systems for example, these components can be implemented by individual computing nodes of a distributed computing system.

Figure 2:
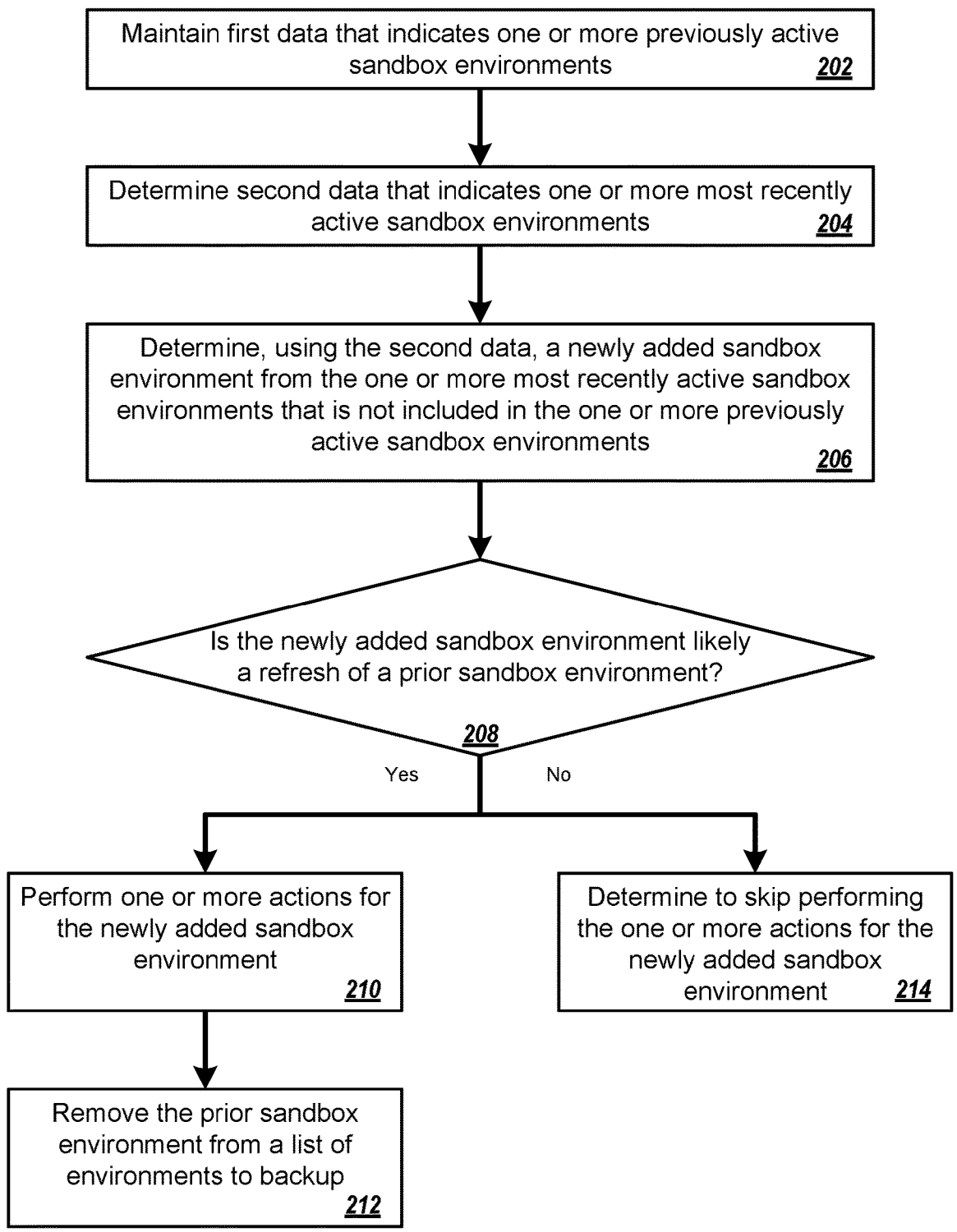
FIG. 2 is a flow diagram of an example process for determining whether a newly added sandbox environment is likely a refresh of a prior sandbox environment.

FIG. 2 is a flow diagram of an example process 200 for determining whether a newly added sandbox environment is likely a refresh of a prior sandbox environment. For example, the process 200 can be used by the backup system 110 from the environment 100.

A backup system maintains first data that indicates one or more previously active sandbox environments (202). The first data can be for a cloud computing environment that includes a live production environment and one or more sandbox environments each of which were seeded using data from the live production environment and are not refreshed with new data from the live production environment. In some examples, the live production environment and the one or more sandbox environments can all be for a single entity.

The backup system can request at least some of the first data from the cloud computing system. For instance, the backup system can use an application programming interface at the cloud computing system to request data, e.g., one or more properties, for all environments for the single entity. The request can be a sandbox process call. The data can be for both active and inactive, e.g., deleted, environments. The first data can include, for at least some environments, an environment name, an environment status, an environment type, an environment identifier, or a combination of two or more of these.

In some examples, at least some of the first data can be generated by the backup system. For instance, the backup system can generate and maintain a list of environments to backup, e.g., for the single entity. The list can indicate environment identifiers for the environments, whether production, sandbox, or both, that the backup system should maintain backups for.

The backup system determines second data that indicates one or more most recently active sandbox environments (204). The backup system can determine the second data as a subset of the first data or as separate data. In some examples, the second data can be separate data from the first data while including at least some of the same properties, e.g., an environment name, an environment identifier, or both. The second data can include an environment name, an environment type, time data, an environment identifier, or a combination of two or more of these.

The backup system can request the second data, or at least some of the second data, from the cloud computing system. The backup system can send a single request or separate requests for the first data and the second data to the cloud computing system. For instance, the backup system can send a sandbox info call to the cloud computing system to request the second data.

The backup system can determine, using the first data and the second data, a newly added sandbox environment from the one or more most recently active sandbox environments that is not included in the one or more previously active sandbox environments (206). In some implementations, the backup system can make this determination using both the second data and the first data. For instance, the backup system can determine which sandbox environments are identified by the second data and are not included in the first data. The backup system can determine the environment identifiers that are included in the second data and not included in the list of environments for which the backup system should create backups. In some examples, the backup system can use creation data, from the second data, to determine the newly added sandbox environment.

The backup system determines whether the newly added sandbox environment is likely a refresh of a prior sandbox environment (208). This can include the backup system determining whether a likelihood that the newly added sandbox environment is a refresh of the prior sandbox environment satisfies a likelihood threshold. The prior sandbox environment can be a) from the one or more previously active sandbox environments and b) not included in the one or more most recently active sandbox environments.

In some examples, the backup system can use, for this determination, a first identifier for the newly added sandbox environment and a second identifier for a prior sandbox environment from the one or more previously active sandbox environments. For instance, the backup system can use the first identifier to determine a subset of the first data, a subset of the second data, or both, for the newly added sandbox environment. The backup system can use the second identifier to determine a subset of the first data for the prior sandbox environment. The prior sandbox environment can be an inactive sandbox environment, e.g., that was deleted. The first identifier and the second identifier can each be environment identifiers.

The backup system performs one or more actions for the newly added sandbox environment (210). The backup system can perform the one or more actions in response to determining that the newly added sandbox environment is likely a refresh of the prior sandbox environment. The backup system can perform the one or more actions using a result of the determination whether the newly added sandbox environment is likely a refresh of the prior sandbox environment.

The one or more actions can include any appropriate actions. Some examples of the actions can include adding the newly added sandbox environment to a list of environments to backup, backing up the newly added sandbox environment, requesting confirmation from a device that the newly added sandbox environment should be backed up, associating the newly added sandbox environment with the prior sandbox environment, or a combination of two or more of these.

The association of the newly added sandbox environment with the prior sandbox environment can enable a device, e.g., a developer device for an employee of the single entity, to analyze data for the newly added sandbox environment concurrently with data for the prior sandbox environment. For instance, the association can enable a comparison of the newly added sandbox environment and the prior sandbox environment. The association can enable restore analysis for the two sandbox environments. The association can enable find operations to find related code or data in the two sandbox environments.

The backup system removes the prior sandbox environment from a list of environments to backup (212). For example, in response to determining that the prior sandbox environment is inactive, e.g., deleted, the backup system can determine to skip all future backups of the prior sandbox environment since there won't be any data to backup, or any changes to the data for the inactive sandbox environment.

In some examples, the backup system can archive a backup for the prior sandbox environment. This can occur when the backup system determines that the prior sandbox environment is inactive, refreshed, or both.

The backup system determines to skip performing the one or more actions for the newly added sandbox environment (214). For instance, the backup system can determine to skip performing the one or more actions in response to determining that the newly added sandbox environment is not likely a refresh of the prior sandbox environment, e.g., or another sandbox environment included in the one or more previously active sandbox environments. Since the backup system did not determine a likelihood that satisfies the likelihood threshold that the newly added sandbox environment, the backup system can determine to not take any automated action for the newly added sandbox environment. This can occur when the backup system determines that there is no data indicating that the newly added sandbox environment should be backed up but was not scheduled for a backup as might occur if the likelihood threshold were satisfied.

The order of operations in the process 200 described above is illustrative only, and determining whether the newly added sandbox environment is likely a refresh of the prior sandbox environment can be performed in different orders. For example, the backup system can determine the second data and then maintain the first data. In some examples, the backup system can remove the prior sandbox and then perform the one or more actions for the newly added sandbox.

In some implementations, the process 200 can include additional operations, fewer operations, or some of the operations can be divided into multiple operations. For example, the process 200 can include operations 202 through 210, operations 202 through 212, operations 202 through 208 and 214, or operations 202 through 208 and 212 through 214.

In some examples, the process 200 can include performing at least some of the operations for one newly added sandbox environment and some others of the operations for another newly added sandbox environment. For instance, the process 200 can include performing operations 202 through 210 for a first newly added sandbox environment and operations 202 through 208 and 214 for a second, different newly added sandbox environment.

In some implementations, the backup system can request confirmation that the newly added sandbox environment is a refresh of the prior sandbox environment, should be backed up, or both. For example, the backup system can provide, to a device, a request for confirmation whether the newly added sandbox environment is a refresh of the prior sandbox environment. The request can include instructions to cause presentation, by the device, of a user interface that requests feedback whether the newly added sandbox environment is a refresh. The user interface can be a visual user interface, e.g., presented on a display, an audible user interface, e.g., presented with a speaker, or a combination of both.

The backup system can use a single request or multiple requests. For instance, the backup system can include a single request that requests confirmation that the newly added sandbox environment is a refresh. The request can include instructions to cause the device to present, upon receipt of confirmation that the newly added sandbox environment is a refresh of the prior sandbox environment, a request whether the newly added sandbox environment should be backed up.

A number of implementations have been described. Nevertheless, it will be understood that various modifications may be made without departing from the spirit and scope of the disclosure. For example, various forms of the flows shown above may be used, with operations re-ordered, added, or removed.

Implementations of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a smart phone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., LCD (liquid crystal display), OLED (organic light emitting diode) or other monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, e.g., an Hypertext Markup Language (HTML) page, to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Particular implementations of the invention have been described. Other implementations are within the scope of the following claims. For example, the operations recited in the claims, described in the specification, or depicted in the figures can be performed in a different order and still achieve desirable results. In some cases, multitasking and parallel processing may be advantageous.

What is claimed is:

1. A system comprising one or more computers and one or more storage devices on which are stored instructions that are operable, when executed by the one or more computers, to cause the one or more computers to perform operations comprising:
    maintaining, for a cloud computing environment that includes a live production environment and two or more sandbox environments each of which were seeded using data from the live production environment and are not refreshed with new data from the live production environment, first data that indicates one or more previously active sandbox environments from the two or more sandbox environments;
    receiving, from the cloud computing environment, second data that indicates one or more most recently active sandbox environments from the two or more sandbox environments, the one or more most recently active sandbox environments comprising at least one sandbox environment that is not included in the one or more previously active sandbox environments;
    detecting, using the second data and the first data, a newly added sandbox environment from the one or more most recently active sandbox environments that is not included in the one or more previously active sandbox environments;
    determining, using a first identifier for the newly added sandbox environment and a second identifier for a prior sandbox environment that is a) from the one or more previously active sandbox environments and b) not included in the one or more most recently active sandbox environments, whether the newly added sandbox environment is likely a refresh of the prior sandbox environment from the one or more previously active sandbox environments; and performing one or more actions for the newly added sandbox environment in response to determining that the newly added sandbox environment is likely a refresh of the prior sandbox environment.

2. The system of claim 1, wherein performing the one or more actions comprises automatically adding the newly added sandbox environment to a list of environments to backup in response to determining that the newly added sandbox environment is likely a refresh of the prior sandbox environment that was previously on the list of environments to backup.

3. The system of claim 2, the operations comprising removing the prior sandbox environment from the list of environments to backup in response to determining that the newly added sandbox environment is likely a refresh of the prior sandbox environment that was previously on the list of environments to backup.

4. The system of claim 1, wherein performing the one or more actions comprises backing up the newly added sandbox environment in response to determining that the newly added sandbox environment is likely a refresh of the prior sandbox environment.

5. The system of claim 4, wherein backing up the newly added sandbox environment comprises:
providing, to a device, a request whether the newly added sandbox environment should be backed up in response to determining that the newly added sandbox environment is likely a refresh of the prior sandbox environment; and
in response to providing the request, receiving a response that indicates that the newly added sandbox environment should be backed up.

6. The system of claim 1, the operations comprising archiving a backup of the prior sandbox environment in response to determining that the newly added sandbox environment is likely a refresh of the prior sandbox environment.

7. The system of claim 1, wherein performing the one or more actions comprises, in response to determining that the newly added sandbox environment is likely a refresh of the prior sandbox environment, associating, in a database, the newly added sandbox environment with the prior sandbox environment to enable joint analysis of the newly added sandbox environment with the prior sandbox environment that was not previously available prior to determining that the newly added sandbox environment is likely a refresh of the prior sandbox environment.

8. The system of claim 7, wherein enabling joint analysis of the newly added sandbox environment with the prior sandbox environment comprises enabling at least one of comparison, find, or restore joint analysis of the newly added sandbox environment with the prior sandbox environment.

9. The system of claim 7, the operations comprising:
providing, to a device, a request for confirmation that the newly added sandbox environment is a refresh of the prior sandbox environment; and
in response to providing the request, receiving a response that indicates that the newly added sandbox environment is a refresh of the prior sandbox environment, wherein associating, in the database, the newly added sandbox environment with the prior sandbox environment to enable joint analysis of the newly added sandbox environment with the prior sandbox environment is responsive to receiving the response that indicates that the newly added sandbox environment is a refresh of the prior sandbox environment.

10. The system of claim 1, wherein determining the second data that indicates the one or more most recently active sandbox environments comprises:
sending, to the cloud computing environment and using an application programming interface, a request for information about active sandboxes for an entity, wherein:
receiving, from the cloud computing environment, the second data that indicates the one or more most recently active sandbox environments for the entity is responsive to sending the request for information about active sandboxes for the entity.

11. The system of claim 10, wherein the second data comprises at least one of an environment name, an environment type, time data, or an environment identifier.

12. The system of claim 1, wherein maintaining the first data that indicates the one or more previously active sandbox environments comprises:
sending, to the cloud computing environment and using an application programming interface, a request for data for all environments for an entity; and
in response to sending the request for data for all environments for the entity, receiving, from the cloud computing environment, at least some of the first data that indicates the one or more previously active sandbox environments for the entity.

13. The system of claim 12, wherein the first data comprises at least one of an environment name, an environment status, an environment type, or an environment identifier.

14. The system of claim 1, wherein determining whether the newly added sandbox environment is likely a refresh for the prior sandbox environment comprises:
determining, using the first data and the second data and the second identifier for the prior sandbox environment, a first time period during which the prior sandbox environment was deleted;
determining, using the second data and the first identifier for the newly added sandbox environment, a second time period during which the newly added sandbox environment was created; and
determining whether the first time period and the second time period satisfy a time period criteria.

15. The system of claim 14, wherein determining the first time period during which the prior sandbox environment was deleted uses i) an environment status and an environment identifier for the prior sandbox environment from the first data and ii) a timestamp for a most recent response that included at least some of the second data and did not include the environment identifier for the prior sandbox environment.

16. The system of claim 15, wherein the first data indicated that the environment status for the prior sandbox environment, prior to receipt of the most recent response that included at least some of the second data and did not include the environment identifier for the prior sandbox environment, was active.

17. The system of claim 1, wherein:
determining whether the newly added sandbox environment is likely a refresh for the prior sandbox environment comprises determining whether the first identifier and the second identifier satisfy an identifier sequence criteria; and performing one or more actions for the newly added sandbox environment is responsive to determining that the first identifier and the second identifier satisfy the identifier sequence criteria.

18. The system of claim 1, wherein determining whether the newly added sandbox environment is likely a refresh for the prior sandbox environment comprises:
   determining, using the first data and the second identifier for the prior sandbox environment, a first environment type for the prior sandbox environment;
   determining, using the first identifier for the newly added sandbox environment, a second environment type for the newly added sandbox environment; and
   determining whether the first environment type and the second environment type satisfy an environment type criteria.

19. One or more non-transitory computer storage media encoded with instructions that, when executed by one or more computers, cause the one or more computers to perform operations comprising:
   maintaining, for a cloud computing environment that includes a live production environment and two or more sandbox environments each of which were seeded using data from the live production environment and are not refreshed with new data from the live production environment, first data that indicates one or more previously active sandbox environments from the two or more sandbox environments;
   receiving, from the cloud computing environment, second data that indicates one or more most recently active sandbox environments from the two or more sandbox environments, the one or more most recently active sandbox environments comprising at least one sandbox environment that is not included in the one or more previously active sandbox environments;
   detecting, using the second data and the first data, a newly added sandbox environment from the one or more most recently active sandbox environments that is not included in the one or more previously active sandbox environments;
   determining, using a first identifier for the newly added sandbox environment and a second identifier for a prior sandbox environment that is a) from the one or more previously active sandbox environments and b) not included in the one or more most recently active sandbox environments, whether the newly added sandbox environment is likely a refresh of the prior sandbox environment from the one or more previously active sandbox environments; and
   performing one or more actions for the newly added sandbox environment in response to determining that the newly added sandbox environment is likely a refresh of the prior sandbox environment.

20. A computer-implemented method comprising:
   maintaining, for a cloud computing environment that includes a live production environment and two or more sandbox environments each of which were seeded using data from the live production environment and are not refreshed with new data from the live production environment, first data that indicates one or more previously active sandbox environments from the two or more sandbox environments;
   receiving, from the cloud computing environment, second data that indicates one or more most recently active sandbox environments from the two or more sandbox environments, the one or more most recently active sandbox environments comprising at least one sandbox environment that is not included in the one or more previously active sandbox environments;
   detecting, using the second data and the first data, a newly added sandbox environment from the one or more most recently active sandbox environments that is not included in the one or more previously active sandbox environments;
   determining, using a first identifier for the newly added sandbox environment and a second identifier for a prior sandbox environment that is a) from the one or more previously active sandbox environments and b) not included in the one or more most recently active sandbox environments, whether the newly added sandbox environment is likely a refresh of the prior sandbox environment from the one or more previously active sandbox environments; and
   performing one or more actions for the newly added sandbox environment in response to determining that the newly added sandbox environment is likely a refresh of the prior sandbox environment.

* * * * *

UNITED STATES PATENT AND TRADEMARK OFFICE
CERTIFICATE OF CORRECTION

PATENT NO. : 12,282,393 B2  
APPLICATION NO. : 18/307501  
DATED : April 22, 2025  
INVENTOR(S) : Gadi Luc Vered Page 1 of 1

It is certified that error appears in the above-identified patent and that said Letters Patent is hereby corrected as shown below:

On the Title Page

Column 2 item (56), (Other Publications), Line 5, please delete "retrived" and insert -- retrieved --.

Signed and Sealed this  
Second Day of September, 2025

Coke Morgan Stewart  
*Acting Director of the United States Patent and Trademark Office*